United States Patent [19]
Colombo

[11] 4,298,497
[45] Nov. 3, 1981

[54] COMPOSITION FOR PREVENTING COLD END CORROSION IN BOILERS

[75] Inventor: Paul T. Colombo, Downers Grove, Ill.

[73] Assignee: Nalco Chemical Company, Oak Brook, Ill.

[21] Appl. No.: 113,545

[22] Filed: Jan. 21, 1980

[51] Int. Cl.³ .................. C10L 10/04; C23F 11/02; C23F 11/18

[52] U.S. Cl. .................. 252/387; 106/14.05; 44/5; 252/8.55 E; 422/9; 423/242; 423/244

[58] Field of Search ............. 252/387, 8.55 E; 44/5; 106/14.05; 422/9; 423/242, 244

[56] References Cited

U.S. PATENT DOCUMENTS

| | | | |
|---|---|---|---|
| 2,546,586 | 3/1951 | Cross | 252/387 |
| 2,992,884 | 7/1961 | Bienstock et al. | 423/244 |
| 3,837,820 | 9/1974 | Kukin | 44/5 |
| 3,886,261 | 5/1975 | Libutti | 423/244 |
| 3,910,854 | 10/1975 | Meyer | 252/387 |
| 4,100,258 | 7/1978 | Vossos et al. | 423/242 |
| 4,134,727 | 1/1979 | Oschell et al. | 422/9 |
| 4,134,728 | 1/1979 | Libutti et al. | 422/9 |
| 4,134,729 | 1/1979 | Libutti et al. | 422/9 |
| 4,140,750 | 2/1979 | Oschell | 423/244 |

FOREIGN PATENT DOCUMENTS 1224427 11/1963 Fed. Rep. of Germany ...... 252/387
822314 10/1959 United Kingdom.

OTHER PUBLICATIONS

Gibson et al., Power Engineering, Apr. 1977, pp. 70–73.
Shields, "Boilers", Dodge, pp. 270–294.
Fryling "Combustion Engineering", Combustion Engineering Inc., 1966, 19-19-19-23.
Woodruff et al., "Steam Plant Operation," McGraw-Hill, pp. 24–31.

Primary Examiner—Benjamin R. Padgett
Assistant Examiner—Irwin Gluck
Attorney, Agent, or Firm—Trexler, Bushnell & Fosse, Ltd.

[57] ABSTRACT

A composition is provided for neutralizing acid corrosive agents in boiler flue gases and like vapors. In large industrial boilers and like systems, flue gases carrying sulfur trioxide contact metal surfaces of heat recovery equipment. Under some circumstances, the sulfur trioxide combines with moisture in the boiler flue gases to produce sulfuric acid. This acid can corrode the surfaces of this equipment. The composition offered here comprises a particulate carrier having a relatively large surface area, and a particulate, active neutralizing agent having a relatively small surface area surface-coated on the carrier. Here, the particulate carrier is bentonite clay and the active neutralizing agent is sodium aluminate.

10 Claims, 1 Drawing Figure

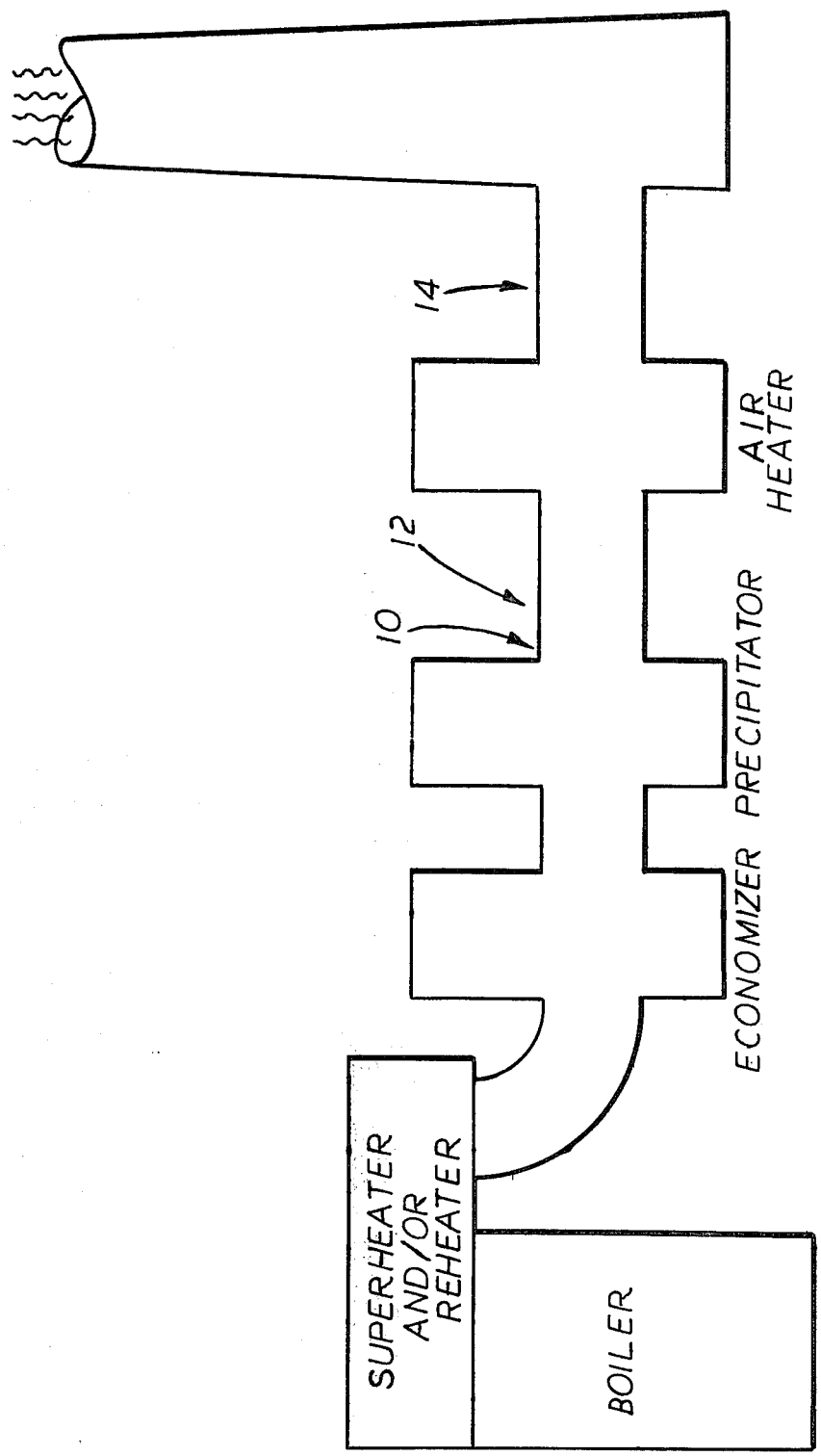

COMPOSITION FOR PREVENTING COLD END CORROSION IN BOILERS

BACKGROUND OF THE INVENTION

This invention relates to a composition and method for removal of acid-corrosive substances from boiler flue gases and like vapors which are flowing in contact with materials that are subject to attack.

A primary example of the damage prevented by the present invention is the corrosion of the "fireside" metal surfaces of heat recovery equipment due to the presence of sulfur trioxide in the boiler flue gas. The sulfur trioxide which results from the combustion of most fuels combines with the moisture vapor in the combusted gas to produce sulfuric acid. This condenses onto the various surfaces at the "cold end" of the boiler when the flue gas temperature falls below the condensation temperature or "dew point" of the acid vapor. Resultant "fireside" corrosion is a principal limiting factor in the use of heat recovery equipment.

Thermal energy recovery equipment is commonly used to maximize the recapture of combustion heat, as the greatest loss of efficiency in boilers is due to heat energy escaping in the exiting gas. To operate a boiler at maximum efficiency, it is necessary to reduce this heat loss to an absolute minimum, a one percent fuel saving being realized for each 40° F. reduction in flue gas temperature.

In order to conserve as much combustion gas heat as possible, it is customary to install, as heat recovery equipment in a boiler or generating unit, two separate recovery systems. First, an economizer is located in the gas passage between the boiler and the stack and is designed to recover a portion of the waste heat from the products of combustion and transfer this heat through a series of metal tubes to the inlet water which flows to the boiler. Second, an air preheater is located downstream from the economizer and consists of metal plates or tubes having hot exit gases on one side and incoming air on the other. The air preheater increases the temperature of the air feeding the combustion system and increases the overall efficiency of the boiler.

Dilute sulfuric acid is known to possess a "dew point" about 200° F. higher than that of water. This "dew point" varies with the relative proportions of the acid and the water vapor. Measured dew points range from 100° to 400° F., the higher values occurring with higher sulfur content fuels. The potential rate of corrosion is known to increase with an increase in the dew point. A minor amount of sulfuric acid conversion takes place at elevated temperatures (to 620° F.). The measured difficulties occur, however, at temperatures below the acid "dew point" (which may vary from 280° to 320 F.) under normal operating conditions.

Generally, corrosion is most noticeable at or after the air heater, for this is the point in the exit gas flow where the metal temperatures fall below the dew point of the acid vapors.

A number of means for minimizing the rate of boiler corrosion have been developed in the past. Since corrosion occurs on the lowest temperature surface, air heater designs have been developed which incorporate replaceable cold end sections. Other means for minimizing corrosion are aimed at increasing the metal temperature. However, this, of course, tends to defeat the economy of the air preheater system.

To avoid the necessity of using corrosion-resistant or replaceable metal parts in the cold end of the boiler, various additives have been suggested to reduce the acid content of flue gases. British Pat. No. 822,314 mentions the prior use of ammonia or tar bases injected into the exit flue gases and notes the disadvantage of the objectionable smell of these compounds. As a solution to these problems, the British Patent suggests the use of alkali metal compounds such as sodium or potassium hydroxide. These caustic agents, while perhaps reducing the acid content of flue gases, provide handling problems and may, if used in excess, contribute to corrosion themselves.

According to U.S. Pat. No. 2,992,884, and alkalized alumina absorber can be used to convert sulfur dioxide to sulfur trioxide and then to aluminum sulfate in the flue gas of a boiler. The absorber is subsequently reacted with a reducer gas and regenerated, but at the cost of an additional plant facility.

U.S. Pat. No. 3,837,820 discloses the burning of fuel in the presence of compounds of manganese and magnesium, with additional amounts of these compounds being added to the flue gases. Due to the cost of these metals and their compounds, the expense of this system tends to negate the advantages of corrosion reduction.

According to U.S. Pat. No. 3,886,261, the sulfur trioxide in flue gas is treated with alumina ($Al_2O_3$); and this method has resulted in some corrosion protection as shown by probes inserted at the cold end of the boiler. However, this patent suggests that the protection afforded results from the deposition of alumina particles on the surfaces of the metallic structures which comprise the cold end of the boiler, rather than a reduction in the level of sulfur trioxide in the flue gas.

U.S. Pat. Nos. 4,140,750; 4,134,728; and 4,134,727 present, respectively, the addition of sodium metasilicate; n-aminoethyl ethanolamine; and mixtures thereof to flue gases to reduce the content of sulfur trioxide. According to these inventions, solutions of the aforementioned substances are dispersed in the flue gases through the use of a sonic feed nozzle in order to obtain satisfactory results. The use of a pressure atomizing nozzle system yields increased costs of installation and maintenance which tends to discourage extensive use. U.S. Pat. No. 4,134,729 describes the use of sodium aluminate and n-aminoethyl ethanolamine as a cold end additive and requires the use of liquid atomizer nozzles and a pressure feed system.

U.S. Pat. No. 4,100,258 discloses a method of removing sulfur trioxide by injecting the flue gas with liquid sodium aluminate.

SUMMARY OF THE INVENTION

According to the present invention, the acid-reducing effectiveness of active neutralizing agents such as sodium aluminate are remarkably increased through the use of a surface-area-enhancing agent. The composition of the invention may be used with little alteration of existing plant equipment and is added to the cold end of a conventional boiler by reliable, inexpensive mechanical means.

BRIEF DESCRIPTION OF THE DRAWING

The drawing is a schematic illustration of a typical utility boiler installation, showing boiler-related equipment and various test and material-injection points.

DESCRIPTION OF THE INVENTION

To afford a high neutralizing effect without the use of strong caustic chemicals, the present invention employs a relatively mild caustic agent which has its active surface area enhanced by a carrier media. It has been found that many mild neutralizing agents are capable of reacting with relatively large amounts of sulfur trioxide but are severely limited in this regard due to their low surface area. By suspending the active neutralizing agent in a carrier having a high surface area, or by coating the active agent on carrier particles, the acid neutralizing ability of these agents is remarkably increased. In addition, the active agent and carrier may be mixed in a slurry and either spray-dried to a powder form and injected, or injected as a slurry into the flue gas. The active agent may also be spray applied to the surface of pulverulent particles of the carrier. These means avoid the complex pressure nozzles which often accompany liquid additive systems.

One active agent which has proved eminently useful is sodium aluminate. A preferred source of an aqueous solution of sodium aluminate is the product sold under the trademark NALCO #2 by the Nalco Chemical Company of Oak Brook, Illinois. This is a highly stable aqueous form of sodium aluminate having the following characteristics:

TABLE I

| Color | Water White to Straw |
|---|---|
| $Na_2O//Al_2O_3$ Ratio | 1.5/1.0 |
| Specific Gravity at 100° F. | 1.450–1.460 |
| $Al_2O_3$ | 19.9% |
| $Na_2O$ | 18.3% |
| Pour Point | Approx. −20° F. |
| pH of 5% Sol | 12.7 |

Magnesium oxide or other neutralizing agents having relatively small surface areas can be substituted for sodium aluminate.

Useful carriers for the practice of the invention include colloidal hydrated silicates such as fuller's earth, kaolin, attapulgus or bentonite clays, and other colloidal, neutral or alkaline materials.

A preferred source of the carrier or suspending agent is the product sold under the trademark SYLER GEL, a purified bentonite clay offered by the Southern Clay Company of Texas. As is well known, bentonite clay is a colloidal hydrated aluminum silicate which consists principally of montmorillonite ($Al_2O_3.4SiO_2.H_2O$) and has the property of forming highly viscous suspensions or gels. Bentonite has a three layer molecular structure which consists of a sheet of $Al_2O_3$ and $MgO$ molecules sandwiched between two sheets of silica molecules.

The sodium aluminate is deposited on the bentonite clay in a preferred ratio of from one percent to fifty percent by weight. This may be accomplished by slurrying or mixing in water with subsequent drying in a manner known in the art.

The resultant powder has provided a relative surface basicity of three to four times that of the sodium aluminate alone. This increase in surface basicity apparently results from the sodium aluminate migrating to the surface of the bentonite clay, thus greatly increasing the effective surface-to-volume ratio and the consequent neutralization power of the sodium aluminate.

The resultant powder is advantageously compatible with commonly used dry chemical injection systems or feeders. The powder flows easily, and effects a substantial cost saving over such prior additives as magnesium oxide. The powder may be fed with less difficulty than magnesium oxide based products because fluidizing or aspirating air is not required to ensure a constant feed rate.

The increase in neutralization efficiency of the present invention is shown by the technique of surface titration. The quantity of basic sites on a finely divided solid can be measured by forming a suspension of the solid in benzene with an indicator adsorbed in its conjugate base form. This suspension is then titrated with benzoic acid dissolved in benzene.

The benzoic acid titres are a measure of the amount of basic sites and have a basic strength corresponding to the $PK_a$ value of the indicator used.

A 1.00 gram sample of the powder to be analyzed was suspended in 100 millimeters of benzene. A small amount (approximately 0.01 grams) of bromo-thymol blue ($PK_a = +7.2$) was added to the suspension and mixed for 4 to 5 minutes. The suspension was then titrated with 0.01 N benzoic acid in benzene until a color change was no longer observed. Once the titration was started it was brought to completion within five minutes. The results are reported as micro-moles per gram ($1 \times 10^{-6}$ moles per gram).

TABLE II

| | Milliliters of Titrant | Micro-Mole/g |
|---|---|---|
| Bentonite | <.01 | 12 |
| Sodium Aluminate | 0.1 | 122 |
| Bentonite:Sodium Aluminate 1:1 by weight | 0.3–0.4 | 366–488 |

As is shown by this laboratory titration, the surface basicity of the neutralizing agent was greatly improved through its mixture with the colloidal carrier.

In order to measure the on-line neutralizing power of the present invention, tests were undertaken at a generating station utilizing 105 MW boilers nominally rated at 780,000 lbs. steam per hour. The units fire low sulfur western or high sulfur Illinois pulverised coal, or blends of both.

Cold end corrosion problems had been limited to some extent through the use of a conventional magnesium oxide based powdered product containing 80% MgO, 8% bentonite clay, 6% urea, and 6% $Na_2CO_3$. This prior art additive was used as a base line against which the neutralizing effect of the present invention was compared. A neutralizing additive according to the present invention was prepared by drying a slurry of 78.25% SYLER GEL clay and 21.75% NALCO #2 liquid sodium aluminate.

It should be noted that there is a lack of an industry-wide standard with regard to cold-end corrosion monitoring methods. Most monitoring tests and techniques have been developed at individual plants without regard to standardization. None of the methods used in the present test or any other test is intended to provide an absolute answer. Instead, they indicate present conditions and provide a means of comparison.

In addition, tests developed at individual plants can have wide variations in results due to the type of fuel used. This is not only because of the different sulfur contents of the fuels, but other components in the dust-particle-laden gases may affect the sulfuric acid dewpoint or test equipment itself. For example, flyash may absorb $SO_3$ and lower the apparent acid concentration until the saturation limit of the flyash is reached. Also, as stated in U.S. Pat. No. 4,100,258, an indication that the acid level in the flue gas is decreasing may result "from coating the probe surface with additive rather than from reacting with the bulk of the sulfur trioxide."

In determining the corrosion rates and sulfur trioxide levels in the test of the present invention the following methods, known in the art, were used:
1. Hot condensor condensation probe, with results expressed as ppm $SO_3$;
2. Land acid dew-point, calculated from dew-point temperature using 13% moisture in the flue gas and expressed as ppm $SO_3$;
3. French corrosion probe, with results expressed as mils of corrosion per year.

A schematic diagram of the hot side of the boiler is shown in FIG. 1. The powdered additives were injected into the flue gas at location 10, directly after the precipitator, by means of a screw feeder. The base line prior art additive which was injected here additionally required the use of "fluffing" air to insure a constant flow rate.

The testing instruments were inserted at 12, after the injection ports but before the air heater; and at 14, between the air heater and the stack.

Full day tests were run for each additive with the furnace burning the same or similar types of coal.

The following results were obtained.

TABLE III

Comparison of French Probe Results:

At Air Heater Outlet

Test Conditions: Duration - 1 hour
Surface Temperature - 239°
Dewpoint - 270° F.-280° F.

| TREATMENT | % SULFUR | CONCENTRATION $SO_3$ (PPM) | CORROSION DATE (MILS PER YEAR) |
|---|---|---|---|
| (A) Firing High sulfur Coal: | | | |
| MgO based powder | 3.7 | 30.3 | 414 ± 66 |
| Clay Suspended Sodium Aluminate | 4.7 | 25.4 | 347 ± 26 |
| Clay Suspended Sodium Aluminate | 4.2 | 29.4 | |
| Clay Suspended Sodium Aluminate | N/A | 35.9 | |
| (B) Firing 30 to 70% Western Coal: | | | |
| MgO based powder | 3.4 | N/A | 621 |
| Clay Suspended Sodium Aluminate | 3.6 | 28.4 | 422 |
| (C) Firing 30% Western Coal: | | | |
| MgO | 3.5 | 8.5 | 189 |
| Clay Suspended Sodium Aluminate | 2.2 | 14.6 | 138 ± 27 |

At Precipitator Outlet - Surface Temperature 295° F.

| TREATMENT | % SULFUR | CONCENTRATION $SO_3$ (PPM) | CORROSION DATE (MILS PER YEAR) |
|---|---|---|---|
| (A) Firing 0 to 30% Western Coal: | | | |
| MgO | 3.4 | N/A | 372 |
| Clay Suspended Sodium Aluminate | 4.1 | 26.5 | 304 ± 139(3) |
| Clay Suspended Sodium Aluminate | 3.6 | 28.4 | |

TABLE IV

COMPARISON OF TEST DATA

| Treatment: | Clay Suspended Sodium Aluminate | MgO Based Powder |
|---|---|---|
| Dosage | 40 lbs/hr | 40 lbs/hr |
| Coal Fired: | Straight Illinois | Straight Illinois |
| Feeder Speeds: | 1275 to 1425 | 1360 to 1400 |
| % Sulfur | 4.2 | 3.7 |
| Coal Fired: Previous Day | Blended Coal 40 to 60% Western | Straight Illinois to 1:00PM Straight Western Remainder |
| Load: | Maximum | Maximum |
| Hot Condenser: | 32.6 | 26.9 |
| Data: (ppm $SO_3$) | 26.6  28.8 | 27.9  28.2 |
| | 27.3 | 29.7 |

TABLE IV-continued

COMPARISON OF TEST DATA

| | | |
|---|---|---|
| 30.4 | | 27.5 |
| 30.0 | 30.0 | 27.5  28.2 |
| 20.5 | | 29.7 |
| 29.4 | | 29.2 |
| 30.5 | 29.3 | 30.3  29.1 |
| 28.0 | | 27.9 |
| | | 25.4 |
| | | 35.0  35.8 |
| | | 47.0 |
| | 29.4 ± 1.8 | 30.3 ± 5.8 |

| Dewpoints: | | |
|---|---|---|
| At Precipitator Outlet | 255° F. | 266° F. |
| | 260° F. | 261° F. |
| | 271° F. | 258° F. |
| | 271° F. | 259° F. |
| | 265° F. | 268° F. |
| | 268° F. | |
| | 265.2° ± 6.6° | 260.5° ± 6.1° |
| At Air Heater Outlet | 272° F. | 270° F. |
| | | 265° F. |
| | 282° F. | 268° F. |
| | | 273° F. |
| | | 280° F. |
| | | 280° F. |
| | 277.0° ± 7.0° | 272.7° ± 6.3° |
| French Probe: | 344 MPY | 377 MPY |
| Corrosion Rate: | 373 MPY | 375 MPY |
| (mils per year) | 324 MPY | 490 MPY |
| | 347 ± 26 | 414 ± 66 |

It was found that the composition of the present invention would not feed properly as long as the "fluffing" air required by the prior art magnesium oxide powder was being blown through the feeder. It appears that the greater flowability of the present compound coupled with the fluffing air results in a constantly changing bulk density above the screw feeders and cause a decreasing feed rate as the chemical rate decreases in the tank. After the fluffing air was turned off, a constant feed of the compound was achieved through the remainder of the trial. Thus, the clay suspended sodium aluminate composition can be fed with less difficulty than the magnesium oxide based product.

The french probe corrosion rates, the data of most importance in this evaluation, were substantially lower for flue gases treated with the composition of the present invention. The greatest benefit was found at the air heater outlets, where most corrosion is found due to the cooler temperatures found there. The corrosion rates on the fireside of the air heater are lower due to the fact that the higher temperatures do not allow the sulfuric acid to condense on the metal surfaces.

In a further test, a powder was made by spraying a concentrated (25%–50% by weight) sodium aluminate solution into a Littleford powder mixer containing bentonite clay. Upon drying, the result was a free flowing powder. When dispersed in a flue gas stream, the acid dew point was reduced by 5° to 19° F. and the $SO_3$ in the gas stream was reduced by 30% to 60% by weight. In addition, the powder also coats the metal in the gas stream and prevents corrosion from condensing sulfuric acid. Heretofore, such coating with prior art additives was to be avoided as it produced a thermal barrier to the proper operation of the air heater. However, the clay suspended sodium aluminate washes substantially easier than prior art powders and allows faster air heater cleaning without any significant additive build-up.

While the invention has been described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

The invention is claimed as follows:

1. A composition for neutralizing acid corrosive agents in a flowing vapor medium, said composition comprising: a particulate carrier comprising a colloidal hydrated aluminum silicate; and a particulate, active neutralizing agent having a relatively small surface area surface-coated on said carrier.

2. A composition for neutralizing acid corrosive agents in a flowing vapor medium, said composition comprising: an acid free colloidal particulate carrier having a relatively large surface area; and a particulate, active alkaline neutralizing agent having a relatively small surface area surface-coated on said carrier.

3. A composition according to claim 1 or 2 wherein said active neutralizing agent is selected from the group consisting of sodium aluminate and magnesium oxide.

4. A composition according to claim 1 or 2 wherein said active neutralizing agent is sodium aluminate.

5. A composition according to claim 1 wherein said active neutralizing agent is sodium aluminate and said particulate carrier is bentonite clay.

6. A composition according to claim 1 wherein said active neutralizing agent is sodium aluminate and said particulate carrier is kaolin clay.

7. A composition according to claim 1 wherein said active neutralizing agent is sodium aluminate and said particulate carrier is fuller's earth.

8. A composition according to claim 1 wherein said active neutralizing agent is sodium aluminate and said particulate carrier is attapulgus clay.

9. A composition for neutralizing acid corrosive agents in a flowing vapor medium, said composition comprising a particulate carrier selected from the group consisting of bentonite clay, kaolin clay, attapulgus clay and fuller's earth; and an active neutralizing agent selected from the group consisting of sodium aluminate and magnesium oxide.

10. A method of reducing the corrosion, in a flue, of metal parts in contact with combustion gases from a sulfur-containing fuel, said method comprising: adding, in a dry form, to a moving stream of said gases an effective amount of a quantity of a pulverulent composition comprising a colloidal hydrated aluminum silicate carrier and a particulate active neutralizing agent selected from the group consisting of sodium aluminate and magnesium oxide surface-coated on said carrier.

* * * * *